Sept. 29, 1970     P. K. BIZILIA     3,531,144

RETAINER RING

Filed Feb. 27, 1969

INVENTOR

PAUL K. BIZILIA

BY

*David W. Tilliott*

ATTORNEY

United States Patent Office 3,531,144
Patented Sept. 29, 1970

3,531,144
RETAINER RING
Paul K. Bizilia, Sayre, Pa., assignor to Ingersoll-Rand Company, New York, N.Y., a corporation of New Jersey
Filed Feb. 27, 1969, Ser. No. 803,002
Int. Cl. F16d 1/06
U.S. Cl. 287—53
2 Claims

ABSTRACT OF THE DISCLOSURE

A retainer ring assembly for holding a socket on a tool spindle and including an annular groove on the spindle having a pair of parallel flats located in the bottom of the groove at diametrically opposed positions. A resilient retainer ring is provided having a gap with a predetermined spacing when the ring is relaxed which is slightly less than the distance between the flats in the annular groove. The ring is assembled in the groove by expanding its slightly and sliding its gap laterally over the flats.

BACKGROUND OF INVENTION

This invention relates to a retainer means and more particularly to a retainer ring adapted to be mounted on a shaft or spindle for holding a member having a bore on the shaft or spindle.

In general, retaining rings which seat in an annular groove provided in a shaft have to be sufficiently resilient to expand enough to slide axially over the shaft until reaching the groove. This necessary ability to expand unduly limits the other characteristics that one may desire in the retaining ring.

SUMMARY OF INVENTION

A principal object of this invention is to substantially eliminate or minimize the above problem by providing a retainer ring means which does not have to be expanded enough to slide axially over its shaft or spindle.

Other important objects are: to provide a retainer ring means which can easily be assembled on its shaft; to provide a novel retainer ring means; and to provide a retainer ring means for attaching a tool socket on a tool spindle.

In general, the foregoing objects are accomplished by providing a shaft or spindle with an annular groove, cutting away the bottom of the groove to form a pair of parallel flats located diametrically opposite each other and spaced apart a given distance and assembling a split retainer ring in the groove by moving it laterally over the flats with the retainer ring having a gap that is slightly less than the given distance between the flats.

BRIEF DESCRIPTION OF DRAWING

The invention is described in connection with the accompanying drawings wherein.

DESCRIPTION OF PREFERRED EMBODIMENTS

Figure 1:
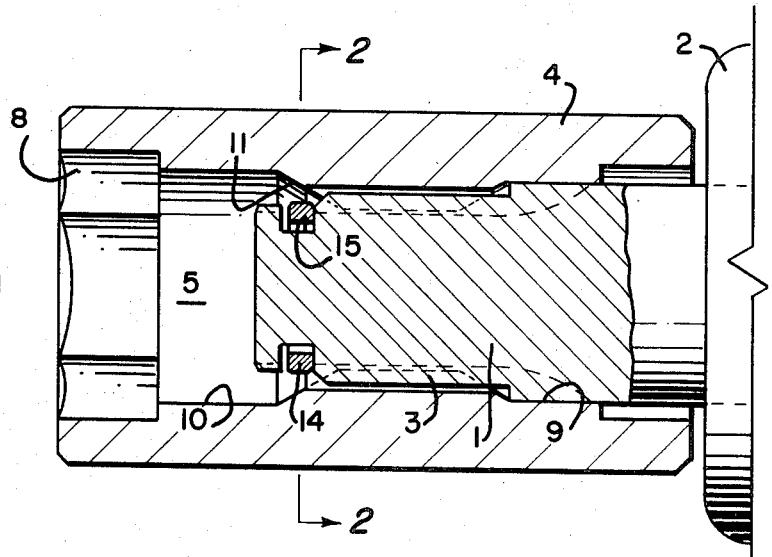
FIG. 1 is an axial section of a wrench socket on the forward end of a power wrench spindle.

The structure shown in FIG. 1 includes a driving spindle 1 projecting from the forward end of a power tool 2, which may be an impact wrench 2, for example. The forward portion of the spindle 1 is provided with a series of longitudinally extending splines 3 which serve as driving surfaces to nonrotatably key the spindle 1 to a tool driving member such as the wrench socket 4 shown in the drawing.

The wrench socket 4 includes an axial bore 5 adapted to receive the spindle 1. The bore 5 has internal flutes 6 which extend longitudinally and are adapted to engage the splines 3 to interconnect the socket 4 and spindle 1 together in driving relationship. The flutes 6 form corresponding internal splines 7 on the interior of the bore 5. The forward end of the socket 4 contains a hexagonal set of wrench flats 8 adapted to engage a nut or a bolt head. The flutes 6 are limited to an intermediate portion of the bore 5 located between a rear nonfluted portion 9 and a front nonfluted portion 10 of the bore 5. The opposite ends of the internal splines 7 on the wall of the bore 5 between the flutes 6 are beveled at 11.

The socket 4 is resiliently held on the spindle 1 by a novel retainer means including a resilient split metal ring 14 loosely fitting in an annular groove 15 provided on the forward end portion of the spindle 1. The retainer ring 14 is sized so that when relaxed it will be of sufficient diameter to abut the beveled ends 11 of the internal splines 7. The flutes 6 and internal splines 7 are located in the bore so that when the socket 4 is mounted on the spindle 1, the retainer ring 14 is located in the front nonfluted portion of the socket bore 5 whereby the ring 14 acts as a resilient detent in yieldably preventing the socket 4 from being withdrawn from the spindle 1. The socket 4 can be withdrawn or mounted on the spindle by applying sufficient force to it for the beveled ends 11 of the internal splines 7 to cam the retainer ring 14 to a smaller diameter, sufficiently for the ring 14 to slide past the internal splines 7.

Figure 3:
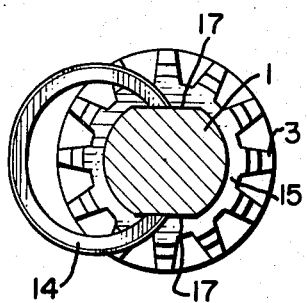
FIG. 3 is a section similar to FIG. 2 omitting the socket and showing the retainer ring partially inserted on the spindle.
Figure 4:
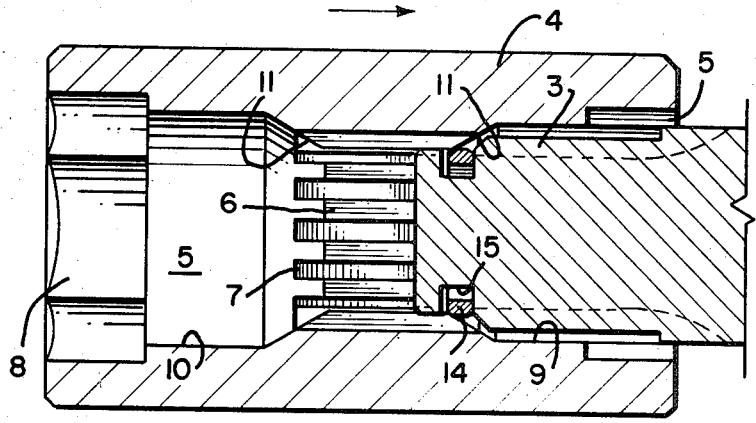
FIG. 4 is an axial view similar to FIG. 1 showing the socket partially inserted on the spindle.
Figure 2:
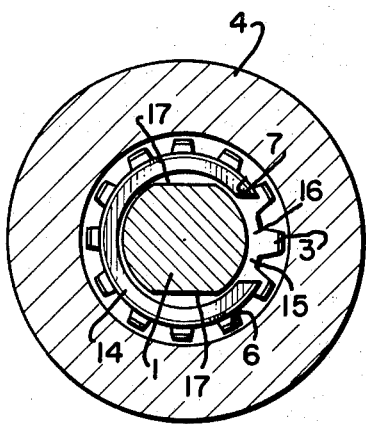
FIG. 2 is a cross section taken on line 2—2 in FIG. 1 showing the socket retaining ring mounted on the spindle.

The retainer ring 14 includes a gap 16 and is mounted in the ring groove 15 by sliding the ring gap 16 laterally or radially over the groove 15, as shown in FIG. 3. In order to enable the ring 14 to be mounted in the ring groove 15 without the necessity of unduly expanding the ring, the bottom of the ring groove 15 is provided with a pair of parallel flats 17 located diametrically opposite each other. The flats 17 are sized in relationship to the ring gap 16 so that the distance between the flats 17 is a little greater than the size of the ring gap 16 when the ring 14 is in a relaxed condition. As a result, the ring gap 16 can be slid laterally over the flats 17 while expanding the ring 14 very little. After being assembled in the groove 15, the ring 14 relaxes so that the gap 16 is no longer wide enough for the ring 14 to drop out of the groove 15. As a result, I believe that I have invented a novel arrangement of a split ring retainer ring assembly.

Although only a single embodiment of the invention is illustrated and described in detail, it will be understood that the invention is not limited merely to the described embodiment but contemplates other embodiments and variations which are obvious from an understanding of the described embodiment and are embraced within the claims.

What is claimed is:

1. The combination of a tool socket, a tool spindle and retainer means for holding the tool socket on the tool spindle, comprising:
   a tool socket having a bore and a tool spindle adapted to be inserted axially into the socket bore, said bore and spindle having cooperating surfaces to enable said spindle to rotatably drive said socket;
   said spindle having an annular groove therein circling its forward end portion;

a resilient split annular retaining ring loosely mounted in said groove and having a predetermined gap between its ends in a relaxed condition, said retaining ring being sufficiently loosely mounted in said groove so that it can be radially compressed in said groove by said socket during its assembly on and removal from said spindle;

the bore of said socket including means operable to automatically compress said retaining ring in said groove when the socket is forced axially onto or off of said spindle and to cooperate with said retaining ring to yieldably retain said spindle during use of the socket; and portions of the bottom of said groove being cut away to form a pair of flats in said groove located diametrically opposite each other with the distance between said flats being slightly greater than said predetermined gap when said ring is relaxed in said groove to enable said retaining ring to be laterally mounted in said groove without unduly expanding the gap in said ring.

2. The combination of claim 1 wherein said cooperating surfaces on said tool spindle and said socket bore are cooperating splines thereon with the ends of the splines on the periphery of said socket bore being angled for compressing said retaining ring in said groove.

References Cited

UNITED STATES PATENTS

| | | | |
|---|---|---|---|
| 1,803,136 | 4/1931 | Schulze | 287—52 |
| 2,584,873 | 2/1952 | Hart et al. | 85—8.8 |
| 2,636,362 | 4/1953 | Dunn | 85—8.9 XR |
| 2,704,681 | 3/1955 | Fischer | 287—53 |
| 2,744,777 | 5/1956 | Mucher. | |
| 2,886,355 | 5/1959 | Wurzel | 85—8.8 XR |

FOREIGN PATENTS 639,877    3/1962    Italy.

REINALDO P. MACHADO, Primary Examiner

A. V. KUNDRAT, Assistant Examiner

U.S. Cl. X.R.
287—119